Feb. 1, 1955    G. A. KLOTZBACH    2,700,849
FOAMING BED FOR THE FOAMING OF FIERY MOLTEN MASSES
Filed April 15, 1952
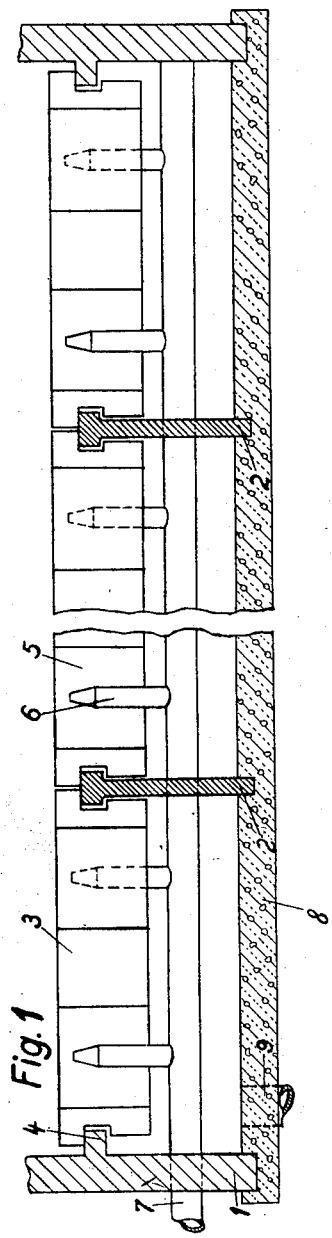
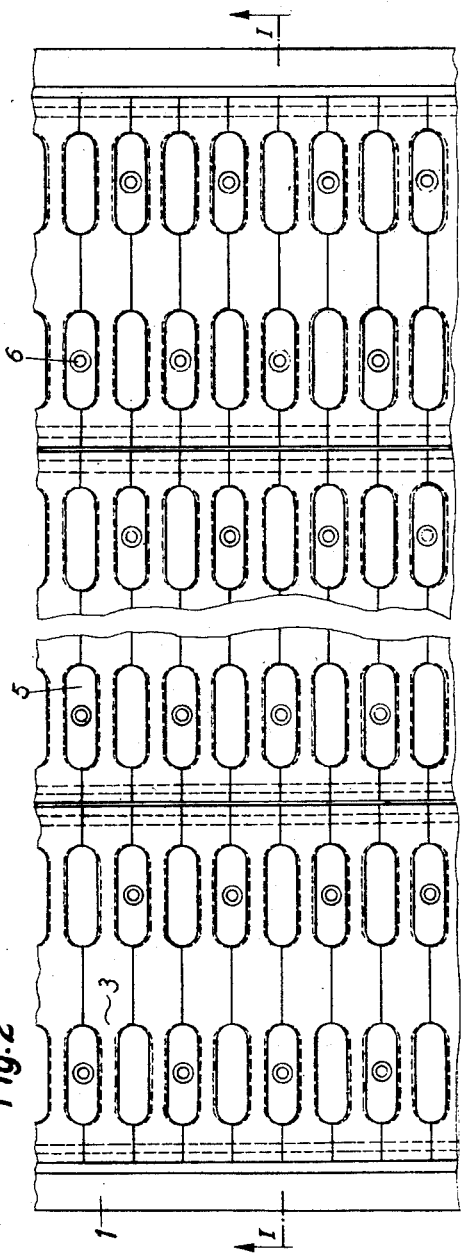
Inventor:
Günter A. Klotzbach
By
Walter Becker
Patent Agent

United States Patent Office 2,700,849
Patented Feb. 1, 1955

2,700,849

FOAMING BED FOR THE FOAMING OF FIERY MOLTEN MASSES

Günter A. Klotzbach, Rheinhausen, Germany, assignor to Huttenwerk Rheinhausen Aktiengesellschaft, Rheinhausen, Germany Application April 15, 1952, Serial No. 282,398

Claims priority, application Germany April 18, 1951

3 Claims. (Cl. 49—1)

The present invention relates to a foaming bed for the foaming of fiery molten masses, for example blast furnace slag, in which the mass is caused to foam by a foaming agent, for example water, which rises through nozzles in the bottom of the foaming bed.

Heretofore known foaming beds of this type have a bottom of porous material. However, such foaming beds have the drawbacks that, when the beds are being emptied, the bottom is easily damaged by the foamed slag sliding over the bottom.

It has been suggested to construct a wear-resistant bottom from iron plates having nozzles for the passage of a foaming agent. When such a bottom is damaged, large portions of the bottom have to be replaced, which involves considerable expense.

It is, therefore, an object of this invention to provide an improved foaming bed for the foaming of fiery molten masses, which will overcome the above mentioned drawbacks.

It is another object of this invention to provide a foaming bed for the foaming of fiery molten masses, in which the bottom of the bed is composed of individual elements which are so arranged that they can individually and easily be exchanged without affecting the nozzles conveying the foaming agent.

It is still another object of this invention to provide an improved foaming bed for the foaming of fiery molten masses, in which the bottom of the bed is so constructed as to be adapted to act as a large reservoir of moisture ready to go into action at the start of the foaming process.

These and other objects and advantages of the invention will appear more clearly from the following specification in connection with the accompanying drawings in which:

Fig. 1 is a vertical section through a foaming bed according to the invention taken along the line I—I of Fig. 2.

Fig. 2 shows a top view of the foaming bed of Fig. 1.

General arrangement

The principal feature of the foaming bed according to the present invention consists in that the bottom of the foaming bed is constructed in form of a grate. The grate can be composed of individual grate bars or similar elements. Preferably, passages or interstices are provided between the grate bars and are filled with a porous mass, e. g., foamed slag. The nozzles are arranged in the said passages or interstices between the grate bars and preferably do not extend up to the upper surface of the grate bars, so that they will not be damaged by the foamed slag sliding over the grate or by a scraper, if used, when the foaming bed is being emptied.

A pan may be provided beneath the grate bars and may communicate with a controllable discharge pipe so that the excess water can rapidly be discharged after the foaming process has been completed.

A foaming bed according to the invention has the advantage that a large reservoir of moisture is available at the start of the foaming process in the porous mass which fills the passages or interstices between the grate bars.

The invention is applicable to both, fixed and tiltable foaming beds.

Structural arrangement

Referring now to the drawings in detail and Figs. 1 and 2 thereof in particular, the foaming bed shown therein is provided with side walls 1 and webs 2. The webs 2 extend along the foaming bed and are spaced from each other and from the side walls by a distance substantially equalling the length of the grate bars 3. The grate bars 3 are supported by or suspended on the heads of the webs 2 and projections 4 on the walls 1 so that they form a continuous bottom for the foaming bed. The grate bars 3 are along their longitudinal sides provided with recesses which, when the grate bars are arranged side by side, supplement each other to passages 5 into which extend nozzles 6 for the admission of the foaming agent. The nozzles 6 extend nearly up to the top of the grate bars and are connected to a supply pipe 7 for the foaming agent. The foaming bed is closed at the bottom by a pan 8 which is filled with porous foamed slag up to the upper surface of the grate bars. The pan 8 is provided with a controllable outlet pipe 9.

Prior to the foaming process, the foaming agent is supplied through the pipes 7 and nozzles 6 to the foaming bed in a sufficient quantity to fill the cavities in the filling of the pan. This quantity of foaming agent is immediately available at the start of the foaming process. During the foaming process, further foaming agent is supplied through pipe 7 to the required extent. At the end of the foaming process and after the supply of foaming agent has been shut off, the outlet pipe 9 is opened and the excess foaming agent in the filling of the pan is discharged.

It is, of course, understood that the present invention is, by no means, limited to the particular constructions shown in the drawings but also comprises any modifications within the scope of the appended claims.

What I claim is:

1. A foaming bed for foaming fiery molten masses, which comprises in combination: a pan, porous material substantially filling said pan and forming a porous bed adapted to store liquid, a plurality of bars arranged alongside each other so as to form a substantially continuous bottom above said porous bed, each of said bars being individually and exchangeably suspended, and said bottom being provided with passages therethrough, and nozzle means arranged for connection with the supply of a foaming agent and extending into said passages.

2. A foaming bed for foaming fiery molten masses, which comprises in combination: a layer of porous material adapted to store liquid and forming a porous bed, a plurality of bars arranged above said porous bed and forming a protective bottom with a substantially continuous bottom surface, said bottom being provided with passage means therethrough, a plurality of webs arranged substantially transverse to the longitudinal direction of said bars, said bars being individually and exchangeably suspended on said webs, and a plurality of nozzle means extending through said porous bed and into said passage means and arranged to convey a foaming agent therethrough.

3. A foaming bed for foaming fiery molten masses, which comprises in combination: a layer of porous material adapted to store liquid, nozzle means extending through said layer of porous material and arranged to be supplied with a foaming agent, and a protective metallic bottom arranged above said layer, said bottom being composed of a plurality of individually exchangeable bars arranged alongside each other so as to form a substantially continuous bottom, said bottom also being provided with passages therethrough into which extend said nozzle means.

References Cited in the file of this patent

UNITED STATES PATENTS

| Number | Name | Date |
|---|---|---|
| 451,652 | Morgan | May 5, 1891 |
| 824,340 | Clark | June 26, 1906 |
| 904,060 | Greenawalt | Nov. 17, 1908 |
| 951,199 | Perkins et al. | Mar. 8, 1910 |
| 1,098,035 | Greenawalt | May 26, 1914 |
| 1,421,989 | Rigg | July 4, 1922 |
| 1,666,790 | Privott et al. | Apr. 17, 1928 |
| 2,464,858 | Gallai-Hatchard | Mar. 22, 1949 |
| 2,465,559 | Urban | Mar. 29, 1949 |